United States Patent [19]

Stuper

[11] Patent Number: 5,082,633
[45] Date of Patent: Jan. 21, 1992

[54] MIX HEAD FOR MIXING REACTIVE CHEMICALS

[75] Inventor: John Stuper, Akron, Ohio

[73] Assignee: The Dow Chemical Company, Midland, Mich.

[21] Appl. No.: 538,298

[22] Filed: Jun. 14, 1990

[51] Int. Cl.$^5$ .............................................. B01J 19/26
[52] U.S. Cl. ................................... 422/133; 239/550; 239/591; 251/360; 251/367; 366/137; 366/159; 366/173; 422/131; 422/135; 422/224
[58] Field of Search ............... 422/131, 133, 135, 224; 366/137, 159, 173; 239/550, 591, DIG. 19; 251/360, 367

[56] References Cited

U.S. PATENT DOCUMENTS

| | | |
|---|---|---|
| 3,931,933 | 1/1976 | Cairns et al. . |
| 4,239,732 | 12/1980 | Schneider ........................... 422/133 |
| 4,241,878 | 12/1980 | Underwood . |
| 4,421,722 | 12/1983 | Massey et al. ...................... 239/591 |
| 4,669,660 | 6/1987 | Weber et al. . |
| 4,705,219 | 11/1987 | Pagdin . |
| 4,707,339 | 11/1987 | Johnson et al. . |
| 4,726,933 | 2/1988 | Mayr et al. . |

FOREIGN PATENT DOCUMENTS

| | | |
|---|---|---|
| 480395 | 2/1938 | United Kingdom ............... 239/591 |
| 2022429 | 12/1979 | United Kingdom . |

OTHER PUBLICATIONS von Hassel; "Processsing 'Exotic' Thermoplastics:How Much Difference?" Plastics Technology, May 1980, pp. 57-67.

Primary Examiner—Robert J. Warden
Assistant Examiner—Amalia Santiago

[57] ABSTRACT

A mixing head for high pressure mixing of reactive chemicals defines a mixing chamber for receiving and mixing oppositely directed impinging chemicals and having an outlet through which the chemicals are discharged after mixing. A separate tubular nozzle assembly for each chemical is replaceably mounted in the body of the mix head and has an inlet for receiving one of the chemicals and an orifice communicating with the mixing chamber. Each nozzle assembly includes a nozzle body and an annular sleeve or ring shaped orifice member of abrasion resistant material defining the orifice and a tubular support fabricated from a non-metallic material, e.g., an internally lubricated super polyamide, snugly spacing the annular orifice member from portions of the nozzle body defining the associated passage and also interfitting with the annular orifice member in supporting relation. After substantial wear of annular orifice member of the nozzle assembly, it can be readily replaced without replacing the other parts of the assembly.

12 Claims, 2 Drawing Sheets

MIX HEAD FOR MIXING REACTIVE CHEMICALS

This invention relates to mix heads for mixing reactive chemicals at high pressure.

BACKGROUND OF THE INVENTION

It is customary in reaction injection molding (RIM) processes to inject metered amounts of two or more reactive chemicals at high pressure and elevated temperature into a cylindrical mixing chamber within the body of a mix head and immediately thereafter to discharge the mixed chemicals into a mold where reaction between the mixed chemicals continues to completion to form a molded polymeric article.

Separate passages are provided within the body of the mix head in communication with separate sources of the chemicals respectively. Typically, each passage has an adjustable nozzle at a discharge end in communication with the mixing chamber for discharging the chemical thereinto at a desired flow velocity during a mixing cycle. Where two such passages are provided for two reactive chemicals, the two nozzles usually discharge into the mixing chamber at diametrically opposed locations to effect high pressure and high velocity impingement mixing of the chemicals as they enter the mixing chamber. Upon completion of the mixing cycle, a reciprocatory plunger is operated in timed relationship to the flow of chemicals into the mixing chamber to expel the mixed chemicals from the chamber through an outlet into the mold.

As the plunger operates to expel the mixed chemicals from the mixing chamber, it simultaneously closes communication between the metering nozzles and the mixed chemicals and simultaneously opens communication between each metering nozzle and an associated recirculating duct, whereby the excess portion of each chemical is recirculated to its source without contacting or reacting with any other chemical. After expelling the mixed chemicals from the mixing chamber, the plunger is returned to its initial mixing position in which communication between the metering nozzles and their respective recirculating ducts is closed or blocked by the head of the plunger and communication is reopened between the mixing nozzles and the mixing chamber to enable initiation of the injection part of the cycle and repetition of the sequential part of the cycle as stated above.

Heretofore the nozzles have been made from steel and are subsequently heat treated to improve abrasion resistance. A number of problems have been encountered when using such steel nozzles, especially when a nozzle must be changed. For example, when the orifice thereof becomes worn or when a different nozzle is required to accommodate different chemicals or a change in operating conditions and removal of the nozzle is required, the nozzle may stick within its receptacle or support structure because a chemical has exuded, i.e., the chemical under pressure has worked its way, between the nozzle and its supporting structure during the high pressure RIM operation and then hardened. When difficulty is encountered in removing the nozzle, breakage of the nozzle may occur and necessitate removal of the mix head from the RIM molding apparatus for reworking and extraction of the nozzle.

The dimensional tolerance for the metering orifice of each nozzle must be closely maintained in order to control the rate of flow of chemicals accurately into the mixing chamber during the mixing cycle. Thus the problems of nozzle wear and replacement have become increasingly important with improving RIM technology utilizing higher mixing pressures and impingement velocities, particularly when reinforcing fillers such as glass fibers or particles are added to the reactive chemicals. The fillers not only require higher mixing pressure that can approximate 2000 psi or more to accommodate the resulting increased viscosity, which in itself increases abrasion, but such fillers also significantly increase abrasion or erosion of the metering orifice and reduce its useful life.

Also the increasing use of fillers in the fluid chemicals has materially increased the difficulty of obtaining optimum mixing of the reactant chemicals within the mixing chamber. Optimum mixing depends upon maintaining an optimum flow rate of each fluid reactant chemical through its metering orifice at an optimum pressure. Such optimum conditions differ for each reactive chemical and depend upon the effective size of the metering orifice, among other factors, including the reactive chemical flow rate to the metering orifice, which necessarily must equal the flow rate through that orifice.

Heretofore an adjustable metering stem in the reactive chemical supply passage to the metering orifice has been employed to compensate for orifice wear and to maintain a predetermined effective size for the metering orifice. In many situations the use of fillers and the consequent higher fluid pressures for the reactant chemical compositions render the use of an adjustable metering stem objectionable because the optimum flow conditions can be most readily maintained when a fixed or non-adjustable metering orifice is used. As a consequence of inevitable wear during high pressure abrasive operating conditions, the fixed orifice rapidly loses its ability for controlling flow velocity, such that replacement is required more frequently than for the less desirable adjustable orifices. Thus the difficulties encountered in nozzle changing have become increasingly significant.

SUMMARY OF THE INVENTION

The present invention is an improved, high pressure mix head for mixing reactive chemicals and shooting or pouring the mixture into a mold or similar receptacle. Similar to conventional high pressure mix heads, the mix head of this invention has (a) a mixing chamber having first and second opposite ends and a longitudinal axis and being closed at one end and having a discharge opening at the other end, (b) a metering plunger closely fitting and slidably positioned in the mixing chamber and mounted for reciprocal axial movement along the longitudinal axis of the mixing chamber from a retracted position during metering of reactive chemicals into the mixing chamber to a forward position after driving the mixture from the chamber through the discharge opening while blocking, during the forward stroke, the entry of additional chemicals until the plunger is returned to the metering and mixing position, and (c) separate nozzles for injecting each reactive chemical at the desired flow velocity through respective ports in the mixing chamber wall.

The improvement of the mix head resides in two or more modified, cylindrical nozzle assemblies, each of which functions to deliver one of the reactive chemicals through one of said ports to the mixing chamber. Each such modified nozzle assembly comprises (1) a hollow body constructed of a structurally strong and inert material such as steel or similar metal and having at one end, an inlet for receiving a reactive chemical, (2) a separately formed orifice member constructed of an abrasion resistant material through which the reactive chemical passes to one of the ports of the mixing chamber, and (3) an enveloping tubular support means for the orifice member replaceably mounted at the other end of the hollow body. The support means is constructed of a non-adherent, inert material different from the metal used in the body and from the abrasion resistant material of the orifice member which the support means supports and holds the orifice member in direct communicating alignment with one of the ports in the mixing chamber. The orifice member is designed and then positioned in the nozzle assembly so that the surfaces of the nozzle assembly which are exposed to the greatest abrading action of the reactive chemical passing therethrough are composed of the abrasion-resistant material. Each nozzle assembly is replaceably mounted in the mix head in an alignment and position such that the streams of the reactive chemicals when introduced into the mixing chamber impinge upon one another and become adequately mixed before exiting the discharge end of the mix head.

One of the primary advantages of the present invention is that the nozzle assembly can be readily removed from the mix head and dismantled. Thus a worn part of the assembly such as an orifice member can be removed from its support means and replaced with a new orifice member without the cost normally incurred in the replacement or restoration of conventional nozzles. Also, by virtue of the modified nozzle assemblies of this invention that facilitate the removal and replacement of an orifice member, an adjustable metering stem which is usually employed in conventional nozzles can be eliminated if desired and a different orifice member having the correct dimensions for the desired chemical flow rate can be replaceably mounted in the support means of the nozzle assembly.

In addition to being more easily and economically maintained than conventional nozzles, the nozzle assembly can also be readily fitted for exchange into conventional nozzles because the support means can be accurately and easily machined to the desired dimension and because the small size of the orifice member enables its cost effective fabrication from expensive abrasion resistant materials.

The modified nozzle assemblies can be usefully employed in straight mixing heads, e.g., as described in U.S. Pat. No. 3,706,515 or in L-shaped mixing heads, e.g., as described in U.S. Pat. Nos. 4,726,933 and 4,707,339.

DETAILED DESCRIPTION OF THE INVENTION

The orifice member which constitutes one of the modifications of the nozzle assembly is composed of any abrasion resistant material which is non-adherent and inert to the support means and the reactive chemical contacting it. This member also has sufficient structural strength, i.e., form sustaining, to withstand the forces arising from impact and vibration existent in a normally operating mix head. Carbides such as refractory carbides, e.g., the carbides of silicon, boron, tungsten, molybdenum and tantalum, as well as the cemented carbides, e.g., tungsten carbide bonded to metals such as iron, cobalt and nickel are preferred abrasion resistant materials. The orifice member preferably has an annular shape and a means for removably mounting it on or within or affixing it to the support means. Further the orifice member preferably has a cuff or flange-like extension which shields all or part of the surface of the support means from the abrading action of the reactive chemical. As a result of the protection of the support means provided by this extension, the support means seldom if ever needs to be replaced.

The support means for supporting and holding the orifice member is preferably a tubular sleeve that has dimensions such that it can hold the orifice member and be replaceably connected to or mounted in the bore of the body of the nozzle assembly. The support means is constructed of a material which is both non-adherent and inert to the orifice member and to the reactive chemicals being introduced into the mixing chamber. The material of the support means has sufficient structural strength to hold the orifice member firmly in place during operation of the mix head. Further the material is able to withstand the temperatures existent in the nozzle assembly without significant distortion and preferably has a coefficient of thermal expansion greater than that of both the orifice member and the body of the nozzle assembly. As a result of the greater coefficient of thermal expansion, the support means expands upon exposure to the temperatures existent during operation of the mix head and, being confined, expands to seal any crevice or crack between the support means and the orifice member as well as similar cracks between the support means and the body of the nozzle assembly which might otherwise be exposed to the reactive chemicals. Such seal prevents the exuding of reactive chemicals between the components of the nozzle assembly and thereby prevents the bonding of the components to each other. Such bonding would make nondestructive separation of the orifice member from the support means as well as separation of the support means from the nozzle assembly body very difficult, if not impossible. Preferably, the material used to construct the support means is an internally or self-lubricated nylon or other polyamide, e.g., a super polyamide marketed by ERTA Inc. under the trade name, ERTALON LFX. A temperature increase of 50° F. (27.8° C.) above ambient is usually sufficient to effect the desired seal when a super polyamide is used. Preferably, the temperature in nozzle assembly during operation is in the range from about 140° F. (60° C.) to about 180° F. (82.2° C.).

Although not required, a metering stem of the type employed in conventional nozzles can be adjustably mounted in the nozzle assembly with respect to the orifice member to provide control over the rate of flow of reactive chemical through the orifice member. When such metering stem is employed, it is preferred that the part of the stem, usually the tip adjacent to the metering orifice, which is exposed to the greatest abrading action consist of the abrasion resistant material.

The hollow body of the nozzle assembly is preferably constructed of steel or other structural metal having similar hardness and other physical properties. The hollow body has an inlet for receiving reactive chemical into the bore or cavity of the body and a seat for holding the support means in proper communicating alignment between the inlet and a port in the wall of the mixing chamber. The body preferably has a generally tubular or cylindrical design and is provided with a connecting collar or similar element for replaceably connecting the support means to the body so that the bore or cavity of the support means is in direct communication with the bore or cavity of the body.

Each nozzle assembly is removably mounted in the mix head such that each reactant chemical passes through one of the nozzle assemblies into the mixing chamber such that the individual streams of reactive chemicals impinge upon one another thereby causing mixing of said chemicals before such chemicals are discharged from the discharge end of the mix head. The mixing chamber, the plunger for opening and closing the mixing chamber to the reactant chemicals and for forcing the mixed chemicals into the discharge end, and the discharge end which may include a discharge or quieting chamber are suitably operated as in conventional mix heads such as described in U.S. Pat. Nos. 4,726,933 and 4,707,339, which are hereby incorporated by reference.

Other advantages of this invention will appear in the following description and appended claims, reference being had to the accompanying drawings forming a part of this specification wherein like reference characters designate corresponding parts in the several views.

DESCRIPTION OF A PREFERRED EMBODIMENT OF THE INVENTION

Figure 1:
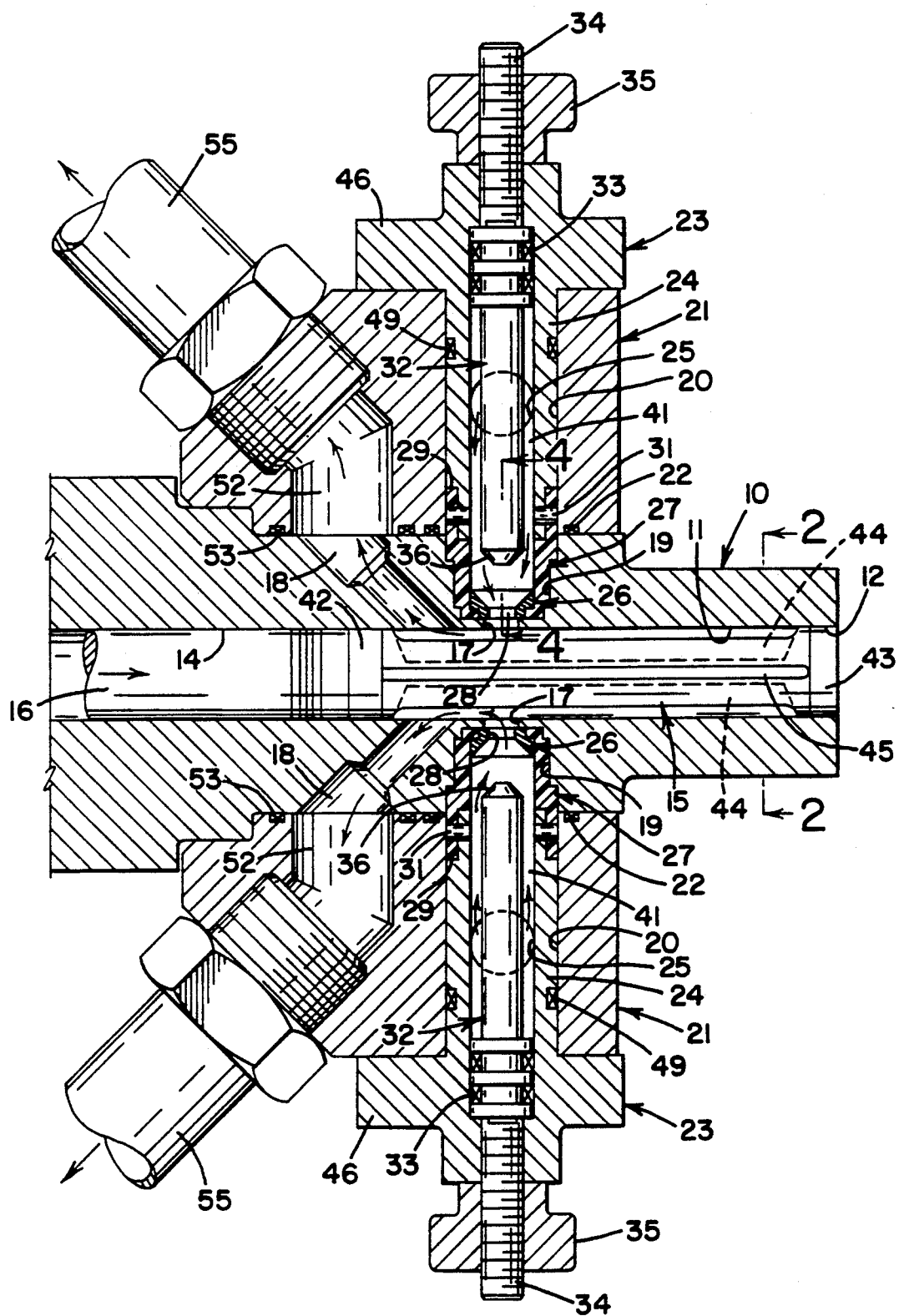
FIG. 1 is a fragmentary schematic midsectional view of the mixing chamber and modified nozzle assembly of a high pressure RIM mix head modified according to the present invention, the view being taken longitudinally of the plunger valve and showing the same in its forward or advanced position after driving and expelling the mixed chemicals from the mixing chamber.
Figure 3:
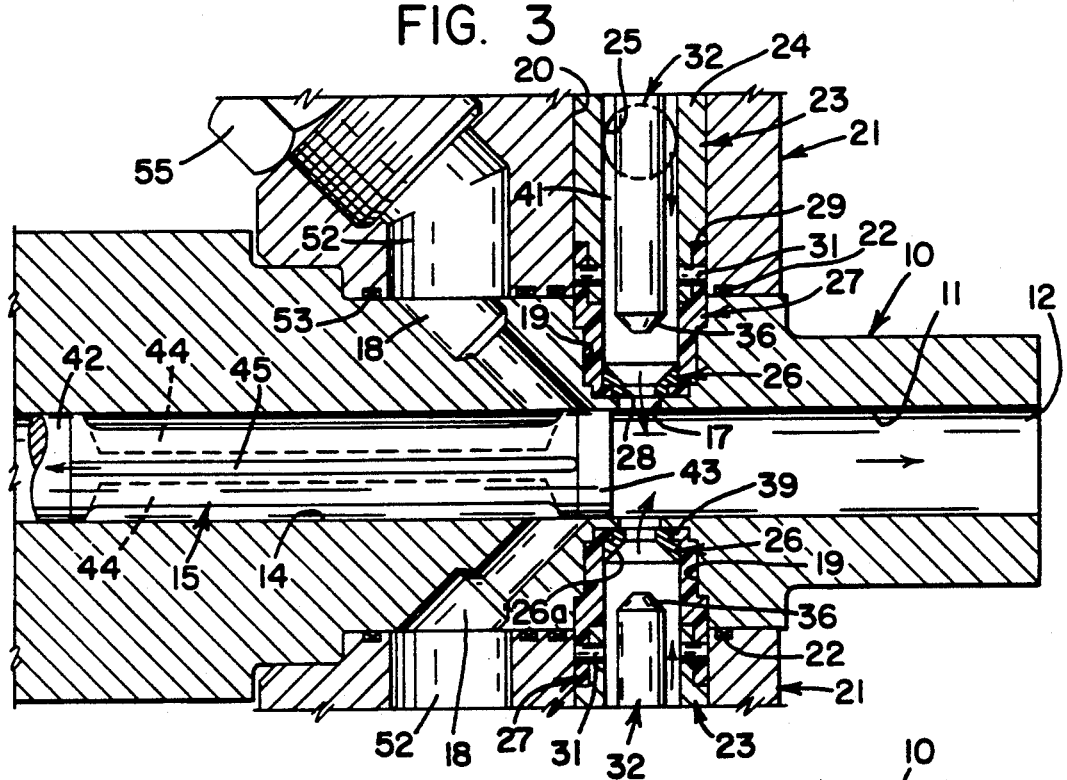
FIG. 3 is a view similar to FIG. 1, showing the plunger in its retracted mixing position.

Referring to the drawings, a mixing head for a reaction injection molding (RIM) apparatus is illustrated in FIG. 1 showing a multiple part mix head body including a steel mix head body 10 defining a mixing chamber 11 having a smooth cylindrical interior surface terminating at one end in an outlet 12 or discharge opening, as identified in FIG. 3, and extending in the opposite direction as a guide portion 14 for a metering plunger 15 reciprocable therein. The plunger 15 is connected by a rod 16 to a double acting hydraulic actuator for the plunger 15 comprising part of an operative hydraulic system, not shown, which may be conventional.

In this preferred embodiment, the apparatus is designed to accommodate two different reactive chemicals. A separate system for supplying each chemical is provided at each of the opposite sides of the mixing chamber 11, FIG. 1. Inasmuch as the two chemical supply systems, as shown, are identical in concept, their corresponding parts are numbered identically. It is understood, however, that the supply systems need not be identical.

A pair of ports 17 in the wall of the mixing chamber 11 in the form of aligned openings in the body 10 open into the chamber 11 at diametrically opposite locations for supplying, respectively, the two separate reactive chemicals during a mixing operation as described below, or to enable recirculating of the separate chemicals respectively through a pair of recirculating ducts 18 when the plunger 15 is at the recirculation position illustrated in FIG. 1. When the plunger 15 is at the mixing position as illustrated in FIG. 3, communication between the ports 17 and the recirculation ducts 18 is closed and the mixing chamber 11 is open to the ports 17 to receive the reactive chemicals.

Two separate openings 19 in mix head body 10, as seen in FIG. 1, which are in communication with the ports 17, respectively, are provided for receiving the support means 27 of the nozzle assemblies 23. Coaxial with the openings 19 are cylindrical openings 20 in an adapter or steel body part 21 suitably secured to the body 10 and sealed thereto by an annular seal 22 around the opening 20. Each tubular nozzle assembly 23 closely lines each pair of coaxial openings 19 and 20. Each nozzle assembly 23 comprises an outer or upstream steel tubular nozzle body 24 having an upstream chemical supply inlet 25 for receiving one of the reactive chemicals, a downstream annular orifice member 26, and a tubular support means 27, best seen in FIG. 4.

Each member 26 provides a conical interior surface converging to a coaxial cylindrical metering orifice 28 that communicates coaxially with the associated port 17. The conical surface 26a of the orifice member 26 acts to shield the support means 27 from the region of greatest abrading forces of the reactive chemical. An offset upstream end portion of each support means 27 closely overlaps the downstream end of nozzle body 24 of the nozzle body 23 and extends axially with a slight spacing up the nozzle body 24 to flange 29. Support means 27 is also releasably secured to nozzle body 24 by diametrically opposed pins 31 carried by and rigidly extending from nozzle body 24. Extending coaxially within each nozzle assembly 23 is a metering stem 32 suitably sealed at 33 within the bore of the nozzle body 24 upstream of the chemical supply inlet 25, adjustable coaxially with respect to the orifice member 26 by screw means 34, and suitably locked in adjusted position by a knurled locking nut 35. The downstream tip 36 of the stem 32 tapers conically in order to seat completely on the interior conical surface 26a of the orifice member 26 but spaced therefrom to provide essentially laminar flow of reactive chemical through the annular passage between the tip 36 and the orifice member 26.

Figure 4:
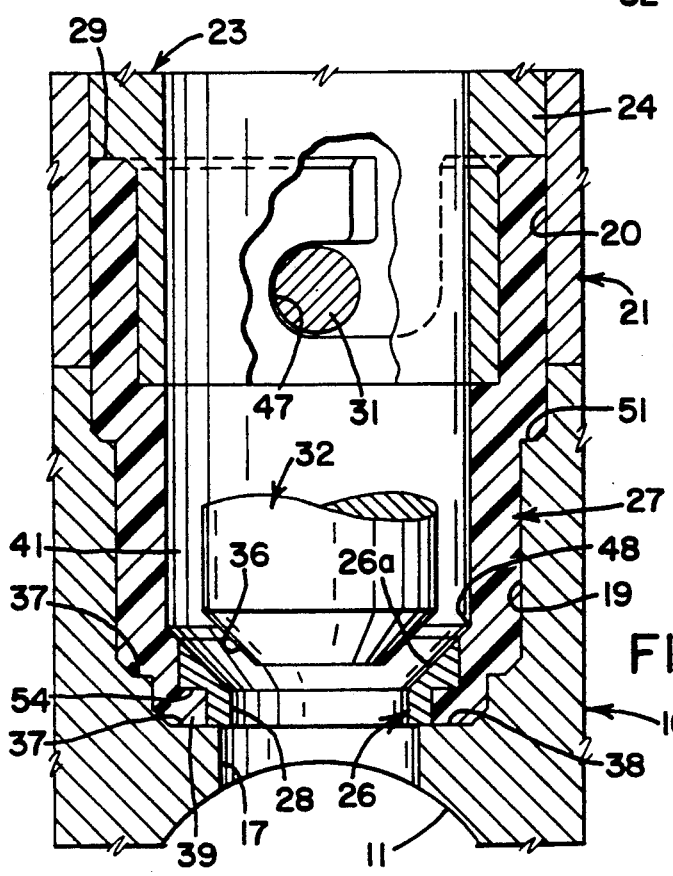
FIG. 4 is a further enlarged fragmentary midsectional view of the ERTALON TM support means of one of the nozzle assemblies, taken in the direction of the arrows substantially along the line 4—4 of FIG. 1 and showing structural details not readily apparent in the preceding views.

The mix head body 10 is provided with an annular step 37, FIG. 4, for seating a mating annular step of the support means 27. The body 10 provides an annular projection 38 that defines port 17 and seats an annular projection 39 of the support means 27, which in turn provides a seat for a mating annular step 54 of the orifice member 26. The diameter of the stem 32 is dimensioned with respect to the interior diameter of the tubular nozzle assembly 23 to provide a flow path 41 of annular section around the stem 32 from the chemical supply inlet 25 to the port 17 into the chamber 11. However, as described above, under high pressure high viscous flow conditions resulting from the addition of fillers to the chemical to be mixed, optimum flow conditions may be achieved by elimination of the metering stem 32 and reliance entirely upon the use of a replaceable orifice member 26 having a precisely dimensioned fixed metering orifice.

Figure 2:
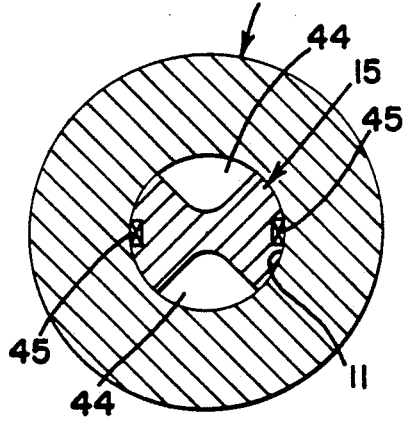
FIG. 2 is an enlarged sectional view through the plunger and mixing chamber taken in the direction of the arrows substantially along the line 2—2 of FIG. 1.

Opposite ends 42 and 43 of the plunger 15 are cylindrical pistons that closely fit within the cylindrical mixing chamber 11 in fluid sealing relation to prevent passage of the reactive chemicals under high pressure, either from the chamber 11 in advance of plunger 15 during plunger action as it moves from the FIG. 3 mixing position toward the outlet 12, or from the portions of the chamber 11 between the ends 42 and 43, as when the plunger 15 is at the FIG. 1 recirculation position. The opposite sides of the plunger 15 confronting the ports 17 are recessed at 44, FIG. 2, to provide passageways to the recirculation ducts 18 when the plunger 15 is in a recycling position. Diametrically opposite sides of the plunger 15 in the midplane normal to the inlets 17 are provided with longitudinal seals 45 to prevent passage of reactive chemicals from one channel 44 to the other.

Each nozzle body 24 is hollow and extends axially outwardly from the adaptor body part 21 and is provided with a flange 46 removably bolted to the exterior of the adaptor 21. Chemical leakage from the mix head is prevented by an annular seal 49 between the nozzle body 24 and adaptor 21 upstream of the chemical supply passage 25. The pins 31 that secure the nozzle body 24 to the tubular support means 27 extend into diametrically opposite mirror image bayonet type openings 47 in the support means 27, that also open upstream therefrom, such that upon loosening the flange 46 and rotating it with the nozzle assembly 23 in a back and forth motion, the nozzle assembly 23 can be removed axially from the adaptor 21 and mix head body 10. Once the nozzle assembly is removed from the mix head, the support means 27 and orifice member 26 can be disconnected from the nozzle body 24. To facilitate such disconnection, the inside diameter of the assembly 23 enlarges at point 48 upstream of the orifice member 26, FIG. 4. After this disconnection, the orifice member 26, which is usually pressed or screwed into a secure position in the support means 27, can be removed from the support means.

The conical tip 36 of the metering stem 32, as well as the orifice member 26 are preferably machined accurately from a wear resistant tungsten-cobalt carbide alloy to provide abrasion resistance to the high velocity and high pressure chemical flow through the restricted annular passage between the conical surfaces of 26 and 36 where the flow velocity is maximum. Also the port 17 is enlarged with respect to the orifice 28, FIG. 4, sufficiently to avoid interference with the metering effectiveness of the orifice 28 and to minimize abrasion of the port 17 by the chemical flow.

The support means 27 preferably comprises the above noted self-lubricating polyamide formulated to provide adequate support for the orifice member 26 and to be non-adherent thereto and to the chemicals being employed. A preferred means 27 that has been successfully tested comprises a class 6 polyamide sold by Erta Inc. under the trademark ERTALON LFX. Although such polyamides are themselves highly resistant to abrasion, the downstream portion of support means 27 at the region of maximum flow velocity is protected from contact with the abrasive chemical by extension 26a of the annular member 26 having an outer periphery that preferably extends upstream of the location of maximum restriction and flow velocity, FIG. 4. The support means 27 extends axially sufficiently to cover the juncture between the mix head body 10 and adapter part 21 and is reinforced by the more rigid and dimensionally stable portion of the steel tubular body 24 that it overlaps, FIG. 4. The major axial extent of the nozzle assembly 23 is provided by the dimensionally stable steel tubular body, whereby the assembly 23 is maintained in properly positioned alignment within the bores 19 and 20 during high temperature and high pressure operation.

Fabrication of the mixhead and especially the portions of the bores 19 and 20 that support the nozzle assemblies 23 is facilitated by providing a separate adaptor 21 for each bore 20. Thus, the overall size of the mixhead body may be reduced and the bores 19 and 20 in the mix head body 10 and adapter 21, respectively, may be readily machined separately to facilitate formation of the annular steps 37 and 51 in a comparatively shallow bore 19 before the body 10 and adapter 21 are secured together. The annular step 51 in the body 10 below its juncture with the adapter 21 accommodates the increased outer diameter of the support means 27 at the region where it overlaps the nozzle body 24 downstream of the juncture 29, thereby to maintain substantially uniform radial thickness for the support means 27.

The thermally induced radial expansion of the support means 27 during operation, as described below, enables relaxation of dimensional tolerances and renders slight variations in the inner diameters of the bores 19 and 20 inconsequential at their juncture. The separate fabrication of the two adapters 21 as comparatively small and conveniently handled parts also facilitates formation of the chemical supply opening 25 and the recirculation passages 52. After the separate fabrication, the mix head body 10 and adapters 21 are assembled and secured together along mating surfaces with the recirculation passages 18 and 52 in communication. A seal 53 is provided around each passage 52 between the mating surfaces, and the passage 52 is connected by a return conduit 55 to the chemical source. Similarly, the chemical supply openings 25 are suitably connected with their respective chemical sources by supply conduits, not shown.

Operation

When not in operation, the cold support means 27 extends snugly between the orifice member 26 and mix head body 10 and between the nozzle body 24 and body 10 and adapter 21. During operation, the heated reactive chemicals flowing into the chamber 11 raise the temperature of each of the support means 27 by at least approximately 50° F. or more, whereupon the greater coefficient of thermal expansion of each support means 27 with respect to each of the orifice members 26 and to the steel body 10 sealingly compacts the support means 27 radially between the adjacent surfaces of the orifice member 26 and interior walls of the mix head body 10 and adapter 21. Axial exudation of the pressurized reactive chemical between the support means 27 and the adjacent surfaces of the orifice member 26 and body 10 against which the support means 27 is compacted is thereby prevented. In the same manner exudation of chemicals between nozzle body 24 and adapter 21 is prevented. As a consequence, the reactive chemicals cannot harden around and stick to the outer peripheral surfaces of the orifice member 26 or the nozzle assembly 23 after prolonged use and hamper the removal of either. Additionally, the structure of the mix head body 10 defining the cylindrical opening 19 can be simplified and the expense of providing seals thereat can usually be eliminated.

Each stem 32 is axially adjusted separately with respect to its associated orifice member 26 as required for the chemical to be mixed. Initially the valve 15 may be at the FIG. 1 recirculating position and the chemicals flowing through the diametrically opposed ports 17 will enter their separate channels 44 and recirculation ducts 18 and return to their sources of supply via passage 52 in adapter 21 and the connected conduit system 55, FIG. 1.

Mixing is initiated by shifting plunger 15 to the FIG. 3 position to effect diametrically opposed impingement mixing of the high pressure chemicals within chamber 11. When a predetermined metered quantity of the chemicals has been mixed within chamber 11, plunger 15 is forced to the FIG. 1 position to discharge the mixed chemicals through outlet 12 which may be connected to a mold. As soon as the valve end 43 passes the ports 17, the chemical flow therethrough continues along the respective channels 44 to the recirculation ducts 18. After the plunger 15 reaches the FIG. 1 position, it may then be retracted to the FIG. 3 mixing position to initiate the next mixing stage and a repetition of the cycle.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. A mix head for mixing at least two reactive chemicals under high pressure comprising
    (a) a mix head body defining within said body
        (1) an elongated mixing chamber for mixing said chemicals, said mixing chamber having first and second opposite ends and a longitudinal axis and being closed at the first end and having an opening at the second end;
        (2) at least two inlet ports in the wall of said chamber for separately introducing said chemicals into the chamber by injection therethrough, said inlet ports being located between said opposite ends and being axially spaced from said second end; and
        (3) at least one discharge outlet in direct communication with said opening at the second end and axially aligned with and axially spaced from said inlet ports for discharging said chemicals after mixing;
    (b) a plunger fitted and slidably positioned in the mixing chamber, mounted for reciprocal axial movement along the longitudinal axis of the mixing chamber between a retracted injection position, wherein the reactive chemicals are injected through the inlet ports into the chamber to form a mixture in said chamber, and an extended position, wherein the plunger is advanced to the discharge outlet to drive the mixture from the chamber and to prevent the mixing of additional chemicals until the plunger is returned to the retracted position; and
    (c) at least two nozzles assemblies replaceably mounted in the mix head body substantially normal to the mixing chamber and aligned with the respective inlet ports in the mixing chamber to separately inject the respective reactive chemicals through the respective inlet ports into the mixing chamber such that impingement mixing of the chemicals occurs, each of said assemblies having
        (1) a nozzle body defining a bore having a longitudinal axis and having an inlet for receiving one of the reactive chemicals at one end of the bore and a connecting device at the other end of the bore, said nozzle body being constructed of a structurally stable material,
        (2) a tubular support means replaceably connected to the connecting device of the body such that said means is in coaxial alignment with the axis of the nozzle body, and
        (3) an orifice member coaxially aligned with and replaceably and securely mounted in the support means and constructed of a non-adherent, chemically-inert, abrasion resistant material different from the material of the nozzle body, said support means being constructed of an essentially non-adherent, chemically inert material different from the material of the nozzle body and the abrasion resistant material and (i) being structurally sufficient to securely hold the orifice member in an aligned and spaced apart relationship to the nozzle body during operation of the mix head, and (ii) having a coefficient of thermal expansion greater than the corresponding coefficients of either of said orifice member and nozzle body such that said support means is effective by thermal expansion during normal operation of the mix head to prevent exudation of chemicals between said support means and said orifice member or between said support means and said nozzle body.

2. The mix head of claim 1 wherein the support means of the nozzle assembly extends circumferentially around the external surfaces of said orifice member and spaces the orifice member from the nozzle body and said orifice member has an extension which shields a portion of the inner surfaces of support means from the abrading action of one of the reactive chemicals when said chemical is being injected into the mixing chamber.

3. A mix head according to claim 1 wherein said orifice member and support means have mating projections supporting said orifice member against downstream movement during the passage of a reactive chemical through the nozzle assembly.

4. The mix head of claim 1 wherein said support means comprises an internally lubricated polyamide.

5. The mix head of claim 1 wherein said orifice member comprises a refractory carbide or a cemented carbide.

6. The mix head of claim 5 wherein said orifice member comprises a carbide of silicon, boron, tungsten, molybdenum or tantalum.

7. The mix head of claim 5 wherein said orifice member comprises tungsten carbide bonded to iron, cobalt or nickel.

8. The mix head of claim 1 including additionally a separate adapter defining a bore into which each nozzle assembly is inserted and replaceably secured, each adapter being attached to the mix head body at a juncture along mating surfaces of the adapter and the mix head body.

9. A mix head for mixing and discharging at least two interreactive chemicals under high pressure in a reaction injection molding machine, comprising:
    (a) a mix head body defining within said body a cylindrical mixing chamber with a sidewall, a cylindrical axis, a discharge end and at least two inlet ports and two outlet ports formed through the sidewall;

(b) at least two nozzle assemblies replaceably mounted in the mix head body and each aligned with one of the inlet ports in said mixing chamber, each assembly defining a flow channel for one of the interreactive chemicals from a supply means to the inlet port, the flow channel including a longitudinal bore of the assembly having an inlet end and a discharge end sealably connected to the inlet port in said mixing chamber, each discharge end being a sub-assembly having a foreshortened sleeve orifice member replaceably secured within a support means therefor that is, in turn, replaceably secured circumferentially to the discharge end of said mixing chamber, said orifice member being formed of an abrasion resistant material of construction that is non-adherent and chemically inert to the chemical being discharged therethrough and said member having a shape sufficient to substantially prevent contact between said support means and the chemical in the regions of greatest abrading action, which are just prior to said discharge end, said support means being formed of a material of construction having sufficient structural strength to securely hold and support said orifice member and being substantially non-adherent and chemically inert to said chemical being discharged therethrough and said support means having a coefficient of thermal expansion greater than the corresponding coefficients of either of said orifice member and nozzle sub-assembly such that said support means is effective by thermal expansion during normal operation of the mix head to prevent exudation of chemicals between said support means and said orifice member or between said support means and said nozzle sub-assembly; and (c) a piston-type plunger positioned within said mixing chamber to reciprocate along its longitudinal axis and said plunger being provided with a means for imparting reciprocal motion thereto, said plunger operating together with said nozzle assemblies to inject and mix the chemicals within the mixing chamber and operating together with the outlet and inlet ports to discharge the mixture from the mixing chamber while providing for separately receiving and separately recirculating each of the respective interreactive chemicals during discharge of the mixture.

10. The mix head of claim 9 wherein a portion of the plunger and the mix head body together define at least two recirculating ducts, one for each chemical, such that when the plunger is discharging the mixture from the mixing chamber, each of the reaction chemicals is separately recirculated via said duct to and from a source for the chemical.

11. The mix head of claim 1 wherein an adjustable stem for controlling the flow velocity of the reactive chemical into the mixing chamber is adjustably and slidably mounted in the nozzle body such that the stem is coaxial with the longitudinal axis of the bore of the nozzle body, said stem having a tip adjacent to the orifice member which tip is constructed of an abrasion resistant material.

12. The mix head of claim 10 wherein the abrasion resistant material of the tip is a carbide of silicon, boron, tungsten, molybdenum or tantalum.

* * * * *

UNITED STATES PATENT AND TRADEMARK OFFICE
CERTIFICATE OF CORRECTION

PATENT NO. : 5,082,633
DATED : January 21, 1992
INVENTOR(S) : John Stuper, Akron, Ohio It is certified that error appears in the above-indentified patent and that said Letters Patent is hereby corrected as shown below:

Column 9, line 63, delete "nozzles" and insert --nozzle--.

Column 12, line 20, delete "reaction" and insert --reactive--.

Signed and Sealed this

Eighth Day of June, 1993

Attest:

MICHAEL K. KIRK

Attesting Officer

Acting Commissioner of Patents and Trademarks